May 8, 1923.
F. S. WARREN
CAMERA
Filed Dec. 9, 1921
1,454,198
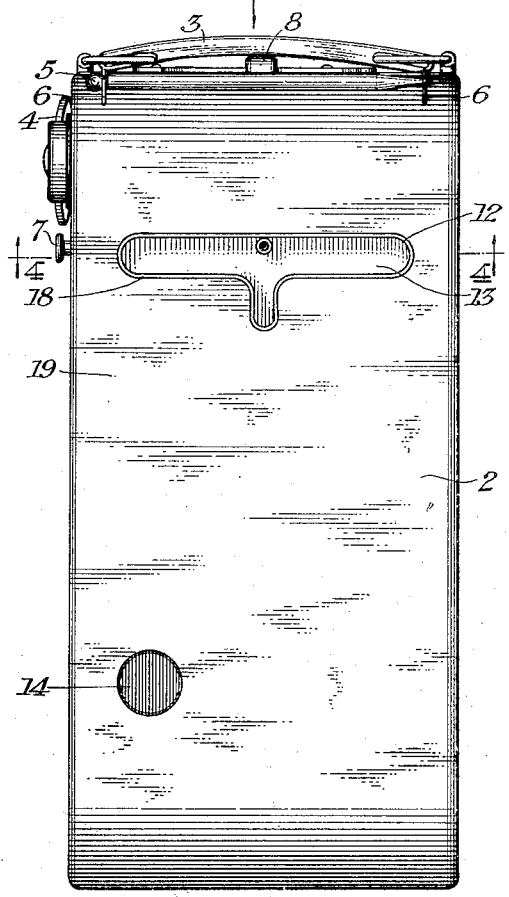
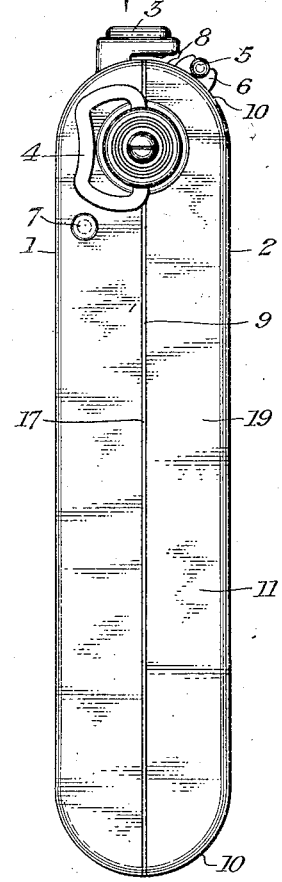
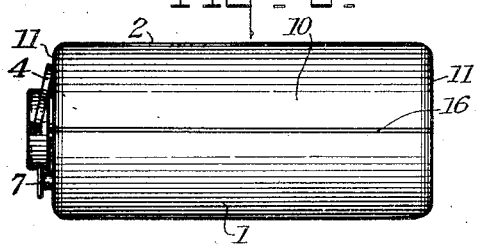
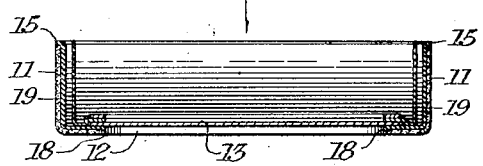
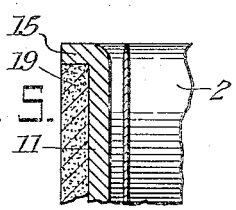

Patented May 8, 1923.

1,454,198

UNITED STATES PATENT OFFICE.

FRANK S. WARREN, OF OAKLAND, CALIFORNIA, ASSIGNOR TO EASTMAN KODAK COMPANY, OF ROCHESTER, NEW YORK, A CORPORATION OF NEW YORK.

CAMERA.

Application filed December 9, 1921. Serial No. 521,226.

*To all whom it may concern:*

Be it known that I, FRANK S. WARREN, a citizen of the United States of America, residing at Oakland, in the county of Alameda and State of California, have invented certain new and useful Improvements in Cameras, of which the following is a full, clear, and exact specification.

This invention relates to an improvement in camera parts and more particularly to the formation of a part of the exterior casing of a camera having a metal body covered with a flexible ornamental covering.

Hand cameras are usually covered with an ornamental covering of leather, imitation leather, or other flexible material, adhesively attached to the casing. When the latter is of metal it has been difficult to insure a permanent adherence of the covering to the metal. While this depends largely on the skillful selection and application of the adhesive, it is to be noticed that the stripping begins at the edges and if these are protected from injury, covers which would not come off unless stripping were once accidentally started, will remain securely in place. The object of my invention is to provide a camera part in which the edges of the ornamental covering are thus protected.

I attain this and other objects by bending up the edges of the metal in a manner to be more fully described. This bent-up flange may also constitute an ornamental feature in the finished camera.

Reference will now be made to the appended drawings, in all the figures of which the same reference characters indicate the same parts:

Fig. 1, is a rear view of a camera, the back of which embodies my invention;

Fig. 2, is a side view thereof;

Fig. 3, is an end view thereof;

Fig. 4, is a section of the camera back, taken on the line 4—4 of Fig. 1; and

Fig. 5, is a fragmentary sectional view on an enlarged scale of one edge of the back shown in Fig. 4.

The camera shown to illustrate one embodiment of my invention is of a popular folding roll-film type having a body comprising front 1, and back 2, and having handle 3, winding key 4, stylus 5, and holders 6 therefor, button 7 for causing the opening of the front, and latch 8 for holding the back upon the camera, it being understood that the camera casing is split longitudinally at 9, the back as a whole being removable. The above structure is no part of my invention and no mention need be made of the other essential camera parts that are not shown.

My invention is particularly embodied in the back 2, as shown, and further description will be restricted to this part. The back 2 is rounded at each end at 10, and has side flanges 11 extending the length of the camera. Toward one end of the back is a window 12, with a slidable opaque shutter 13, these features being used in connection with the stylus 5, in making light printed inscriptions on the film in a well known manner. There is also the usual window 14 with a colored screen through which indicia on the film or backing paper may be observed.

The back is struck up from a piece of sheet metal and the edges thereof, are upturned to form a continuous flange 15, perpendicular to the adjacent sheet metal of the back. The flange extends across the ends of the camera, being indicated at 16 in Fig. 3, and lengthwise thereof, as indicated at 17 in Fig. 2. A similar flange is shown at 18 continuously surrounding the window 12. The camera is covered with leather or other flexible material 19. The height of the flange 15 is equal to the thickness of the covering 19 as shown in Figs. 4 and 5, and is, therefore, flush with its surface. Since the covering is sharply cut to fit snugly upon the metal surface and within the flange, and since the inner wall of the flange is straight, it is evident that the edges of the material are effectively protected from injury; and accidental loosening of covering material that has not begun to separate is avoided.

The turned-up flange presents a narrow edge of the same width as the thickness of the sheet material that outlines the part, and may be finished in such a way as to give a sharp visual contrast with the finish of the covering, thus constituting a desirable ornamental feature of the camera.

Having thus described my invention what I claim as new and desire to secure by Letters Patent is:

1. An article of manufacture adapted to constitute a part of the exterior casing of a camera and comprising a thin malleable sheet of metal, the edges of which are struck up at right angles to form continuous flanges extending outwardly, and a layer of flexible material secured adherently to the outer surface of said sheet and with its edges abutting the inner wall of the flanges, the thickness of the exposed edge of the flange being the same as the thickness of the sheet and the height of the flanges being substantially the same as the thickness of the flexible layer, whereby the flanges protect the edges of the layer.

2. An article of manufacture adapted to form part of the exterior casing of a camera and comprising a sheet of metal, the edges of which are struck up to form continuous flanges extending outwardly, and a layer of ornamental coating material secured snugly to the outer surface of the part and fitting snugly within the flanges, the height of the flanges being substantially the same as the thickness of the ornamental coating and protecting the edges of the coating.

3. An article of manufacture adapted to form part of the exterior casing of a camera and comprising a sheet of metal, the edges of which are struck up to form continuous flanges extending outwardly, and a layer of ornamental coating material secured snugly to the outer surface of the part and fitting snugly within the flanges, the height of the flanges being substantially the same as the thickness of the ornamental coating and protecting the edges of the coating, the exposed surface of the coating and the outer edge of the flange being so finished as to present a pronounced visual contrast.

Signed at Oakland, California, this 29th day of November, 1921.

FRANK S. WARREN.